(12) United States Patent
Gaikwad et al.

(10) Patent No.: US 12,364,936 B2
(45) Date of Patent: Jul. 22, 2025

(54) FILTER SYSTEM FOR COOLANT (71) Applicant: Rivian IP Holdings, LLC, Plymouth, MI (US)

(72) Inventors: Mayur Gaikwad, Farmington Hills, MI (US); Nitin Neralkar, Northville, MI (US); Henry Huang, Ann Arbor, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 1200 days.

(21) Appl. No.: 16/685,894

(22) Filed: Nov. 15, 2019

(65) Prior Publication Data

US 2020/0155970 A1  May 21, 2020

Related U.S. Application Data

(60) Provisional application No. 62/768,681, filed on Nov. 16, 2018.

(51) Int. Cl.
*B01D 19/00* (2006.01)

(52) U.S. Cl.
CPC ..... *B01D 19/0042* (2013.01); *B01D 19/0031* (2013.01)

(58) Field of Classification Search
CPC .......... B01D 19/0042; B01D 19/0031
See application file for complete search history.

(56) References Cited

U.S. PATENT DOCUMENTS

| | | | |
|---|---|---|---|
| 8,038,878 B2 | 10/2011 | Hewkin | |
| 8,101,089 B2* | 1/2012 | Drewelow | B01F 23/23105 95/263 |
| 11,291,930 B2* | 4/2022 | Chen | B01D 19/0042 |
| 2005/0081716 A1* | 4/2005 | Morita | B01D 19/0042 95/241 |
| 2013/0081985 A1* | 4/2013 | Offerle | F15B 1/26 210/167.01 |
| 2017/0373359 A1 | 12/2017 | Krull et al. | |

* cited by examiner

*Primary Examiner* — Youngsul Jeong
(74) *Attorney, Agent, or Firm* — Haley Guiliano LLP (57) ABSTRACT

A reservoir system for liquid cooling includes an inner volume, with one or more inlet ports and one or more outlet ports for directing a flow of coolant. The reservoir system includes an opening, covered by a cap, that can receive a filter for filtering the coolant. The filter is sealed against an inner surface of the reservoir, wherein fluid flows through the filter element, and wherein the filter element is removable through the opening. The reservoir system includes a by-pass that directs a portion of flow from the inlet to the outlet, before or after the filter, while another portion of the flow traverses the inner volume for de-gassing. The relatively larger inner volume with corresponding lower velocities allows bubbles to escape to a freeboard region, thus de-gassing the coolant. The by-pass may be internal to, external to, integrated with, or a combination thereof, the reservoir.

18 Claims, 6 Drawing Sheets

FILTER SYSTEM FOR COOLANT

CROSS-REFERENCE TO RELATED APPLICATION

This application claims the benefit of U.S. Provisional Patent Application No. 62/768,681, filed Nov. 16, 2018, the disclosure of which is hereby incorporated by reference herein in its entirety.

The present disclosure is directed towards a filter system, and more particularly towards a system for filtering and de-gassing a coolant stream.

INTRODUCTION

De-gassing coolant generally requires routing an amount of fluid to a tank where the air is separated from the coolant. Coolant streams sometimes require filtering, which is typically performed by an in-line filter element. It would be advantageous to provide de-aeration and filtration while avoiding the need to flush the coolant system when replacing a filter.

SUMMARY

The present disclosure is directed to a reservoir system for a liquid cooling system. In some embodiments, the reservoir system includes an inner surface, an inlet port, an outlet port, an opening, a cap, and a filter element. The inner surface is configured to contain liquid and defines an inner volume. The inlet port is configured to receive a flow of a coolant. The outlet port is configured to deliver the flow of the coolant, wherein the reservoir is configured to cause the fluid to flow from the inlet to the outlet. The opening is arranged at the top of the reservoir, and the cap is configured to cover and uncover the opening. The filter element is sealed against the inner surface, fluid flows through the filter element, and the filter element is removable through the opening.

In some embodiments, the reservoir system includes a by-pass passage configured to route a portion of the fluid flow to the outlet port without flowing through the filter element. For example, in some embodiments, the by-pass passage includes a molded passage along the inner surface. In some embodiments, the reservoir system includes an outer surface not in contact with the coolant, and the by-pass passage includes a molded passage along the outer surface.

In some embodiments, the reservoir system includes one or more baffles configured to direct a portion of the flow, and includes a by-pass passage configured to route a remaining portion of the fluid from the filter element to the outlet port without encountering the baffles. For example, the one or more baffles are configured to reduce a velocity of fluid flow.

In some embodiments, the filter element includes a particulate filter. In some embodiments, the filter element includes a cylindrical element. For example, in some embodiments, the cylindrical element includes an open end configured to receive the first portion of the fluid, a radially inner surface, and a radially outer surface. Fluid flows from the open end to the radially inner surface, and fluid flows from the radially inner surface to the radially outer surface. In a further example, the cylindrical element includes a closed end that is impermeable to flow of the fluid. In a further example, the cylindrical element includes a closed end that is permeable to flow of the fluid. In a further example, the cylindrical element includes a closed end, and the reservoir system includes an annular recess configured to seat the closed end of the cylindrical element. In a further example, the reservoir system includes a circular opening, and the cylindrical element includes an annular gasket proximate to the open end configured to provide a fluid seal between the filter element and the circular opening.

In some embodiments, an upper portion of the inner volume includes a freeboard region housing a gas phase. In some embodiments, the inlet port is positioned above a top of the filter element. In some embodiments, the inlet port is positioned below a top of the filter element, and the reservoir system includes a passageway between the inlet port and the top of the filter element.

In some embodiments, the present disclosure is directed to a reservoir system having two regions for a liquid cooling system. The reservoir system includes an inner surface, at least one inlet port, an outlet port, a baffle, a first region, and a second region. The inner surface is configured to contain liquid and define an inner volume. The at least one inlet port is configured to receive a flow of a coolant, and the outlet port is configured to deliver the flow of the coolant. The reservoir is configured to cause the fluid to flow from the inlet to the outlet. The baffle is configured to direct a first portion of the flow to a first region of the inner volume, wherein the first portion of the flow crosses a filter element. The baffle is also configured to direct a second portion of the flow to a second region of the inner volume, wherein the second region is configured to de-gas the second portion of the flow, and wherein the second portion of the flow does not cross the filter element.

In some embodiments, the baffle is configured to house the filter element. In some embodiments, the baffle includes a solid wall that is impermeable to the coolant, and at least one opening that is permeable to the coolant. The second portion of the flow flows through the at least one opening. In some embodiments, the reservoir system includes an opening arranged at the top of the reservoir, and a cap configured to cover and uncover the opening. In some such embodiments, the filter element is removable through the opening when the cap is removed.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to a flow-through, de-gassing reservoir for coolant. For example, the reservoir may include a bottle, a tank, any other suitable structure having an internal volume, or any combination thereof. In some embodiments, the reservoir includes a by-pass flow path. For example, in some embodiments, the flow is by-passed around the filter. In a further example, in some embodiments, the flow is by-passed around a de-gassing portion of the reservoir. To illustrate, in some embodiments, the reservoir may include an internal or external by-pass for coolant such that coolant having entrained air flows through the expansion region of the reservoir while the rest of the coolant flows through the by-pass. In the expansion region, coolant flows through and around baffles to reduce flow velocity and separate air and coolant before returning to the outlet port where it mixes with coolant from the by-pass. In this way, a portion of the inlet flow is filtered and de-gassed (e.g., requiring less pressure loss and pumping work than if the entire flow were filtered). In some embodiments, all of the inlet flow is filtered and de-gassed.

Figure 1A:
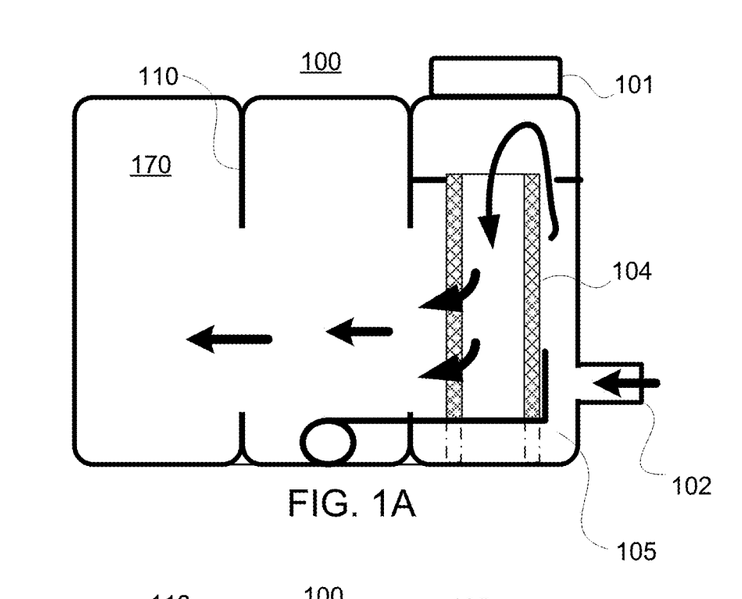
FIG. 1A shows a cross-sectional side view of an illustrative reservoir, in accordance with some embodiments of the present disclosure.
Figure 1B:
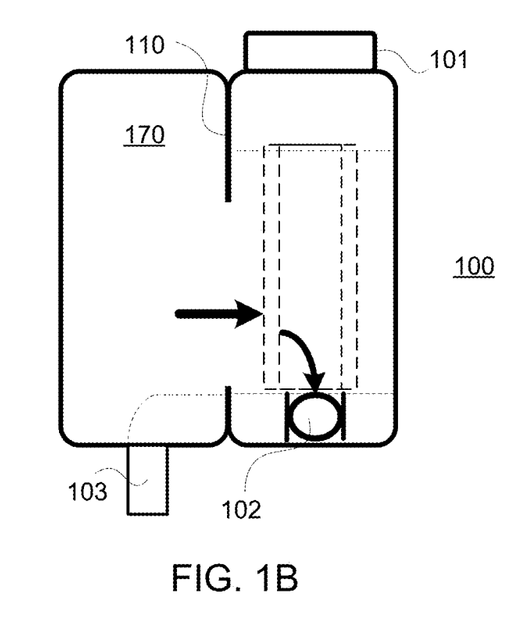
FIG. 1B shows an end view of the illustrative reservoir of FIG. 1A, in accordance with some embodiments of the present disclosure.
Figure 1C:
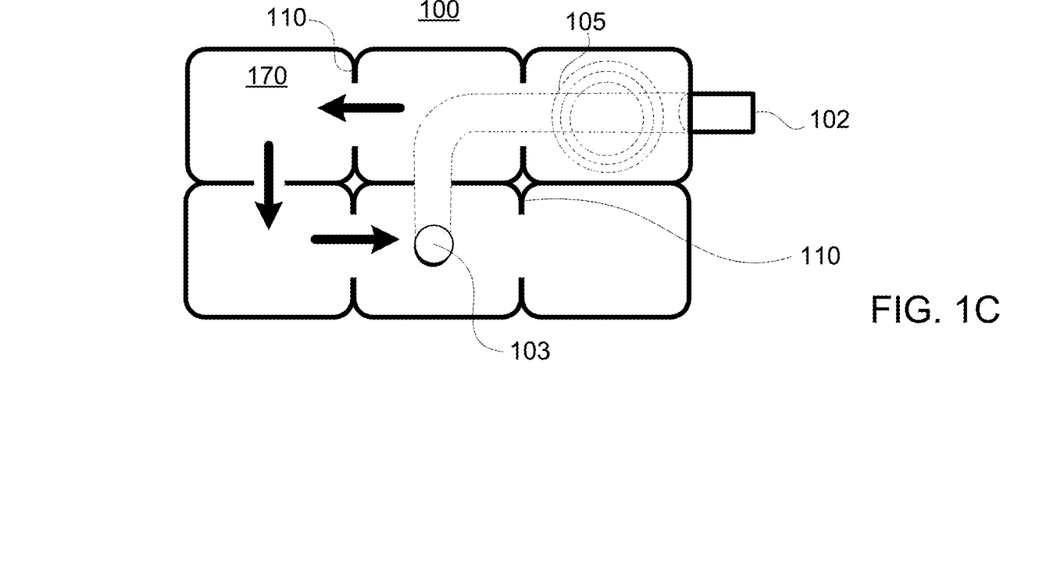
FIG. 1C shows a bottom view of the illustrative reservoir of FIG. 1A, in accordance with some embodiments of the present disclosure.
Figure 1D:
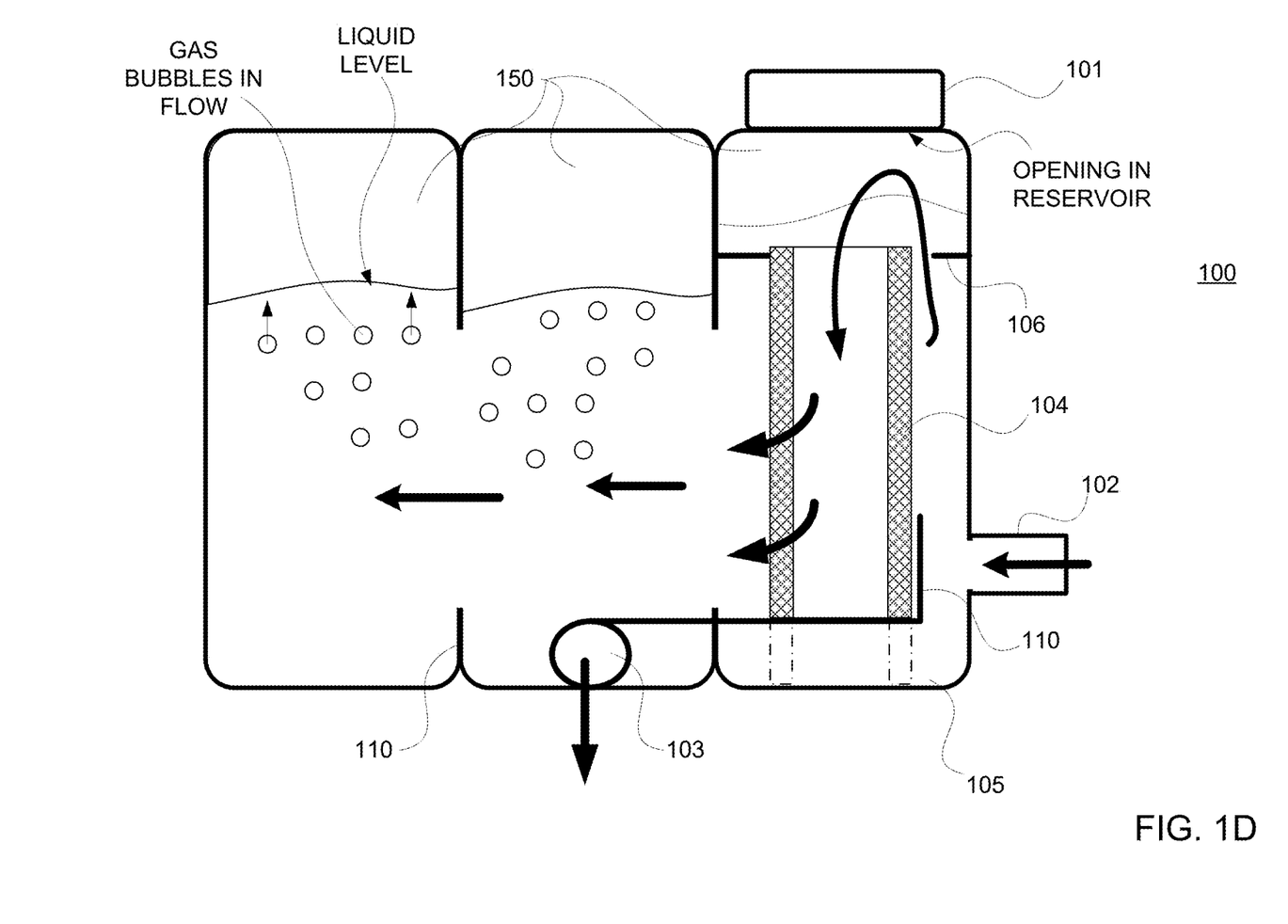
FIG. 1D shows a cross-sectional side view of the illustrative reservoir of FIG. 1A, while operating, in accordance with some embodiments of the present disclosure.

FIGS. 1A-1D show four views of illustrative reservoir 100 having an internal by-pass (e.g., by-pass 105), in accordance with some embodiments of the present disclosure. FIG. 1A shows a cross-sectional side view of the reservoir, FIG. 1B shows an end view of reservoir 100, FIG. 1C shows a bottom view of reservoir 100, and FIG. 1D shows a side cross-sectional side view of reservoir 100 during operation, in accordance with some embodiments of the present disclosure.

As shown in FIGS. 1A-1D, coolant enters the reservoir at inlet 102, which may include, for example, a tube, a pipe, a hose, one or more fittings, a flange, any other suitable port for supplying fluid to the reservoir, or any combination thereof. For example, inlet 102 may include barbed fittings coupled to hosing, compression fittings coupled to tubing, threaded fittings coupled to piping, a bolted flange interface, any other suitable interface, or any combination thereof. The fluid is by-passed into a by-pass stream and a filtered stream. The by-pass stream is directed to outlet 103, while the filtered stream is directed through filter 104 and into the bulk of reservoir 100 for de-aeration (e.g., in volume 170). The filtered stream enters the bulk volume, wherein the flow velocities are reduced relative to that of the inlet stream flowing in inlet 102. The reduced flow velocities in the bulk volume allow phase separation to occur, wherein gas bubbles undergo upward motion due to buoyant effects. The bubbles move upward and join freeboard region 150 above the liquid (e.g., the bulk gas phase above the liquid coolant). Reservoir 100 includes baffles 110 (e.g., as illustrated, although baffles need not be included) to further prevent local high-velocity regions and even the flow velocity. Reservoir 100 includes cap 101, configured to seal reservoir 100, cover an opening of the reservoir, retain filter 104, or a combination thereof.

In some embodiments, reservoir 100 may be configured so that the pressure drop across the by-pass from inlet-to-outlet (e.g., inlet 102 to outlet 103), and the pressure drop across filter 104 and bulk volume from inlet-to-outlet is the same and defines the flow split between the by-pass stream and filtered stream. For example, the geometry of inlet 102, by-pass 105, outlet 103, filter housing, baffles, and bulk volume along with the filter permeability may determine the flow split. In a further example, the flow split may depend on coolant flow rate at the inlet. In an illustrative example, the by-pass flow and the filtered flow may be equal (e.g., if the total flow is 30 L/min, then nominally 15 L/min flows through the by-pass). In a further illustrative example, the by-pass flow may be less than or greater than the filtered flow. In some embodiments, the flow split between the by-pass and filter may depend on pump power requirements, de-gassing effectiveness, filter requirements, filter element properties, or other requirements. In some embodiments, the flow split may be determined, altered, or both by including a flow restriction in by-pass 105 or in the filter stream path.

In some embodiments, filter 104 (e.g., as shown in FIGS. 1A-1D) may be configured to block particulate matter of a particular size range. For example, filter 104 may be configured to filter out particles larger than 100 microns, larger than 10 microns, larger than 1 micron, or any other suitable range. In some embodiments, filter 104 is removable. For example, cap 101 may be removed (e.g., unscrewed) and filter 104 can then be removed, replaced, and installed through the uncapped opening. In some embodiments, filter 104 includes a cylindrical filter element with one open end and one closed end. The closed end may be, but need not be, configured to seal against the bottom of reservoir 100 (e.g., in an annular recess) and the open end may seal along an edge to seal at the top against reservoir 100 (e.g., via a gasket integrated into filter 104 at surface 106) to create a flow path from the inner surface to outer surface of filter 104. The top seal may include flow paths that direct fluid from the inlet to the open end of filter 104 (e.g., without by-passing filter 104). In some embodiments, a reservoir may include a by-pass around the filter (e.g., separate from the by-pass and still directed to the de-aerating portion of the reservoir).

For example, by-pass 105 of FIG. 1 may be molded into reservoir 100 (e.g., a single piece), and run along the inner surface of the bottom of the interior of reservoir 100. In a further example, by-pass 105 of FIG. 1 may include separate conduit that may be routed along the inner surface of the bottom of the interior of reservoir 100.

Figure 2A:
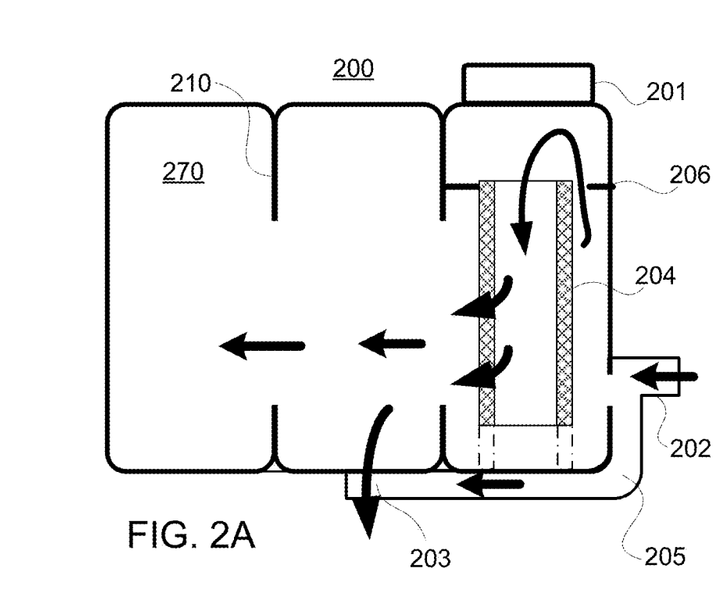
FIG. 2A shows a side view of an illustrative reservoir having an external by-pass, in accordance with some embodiments of the present disclosure.
Figure 2B:
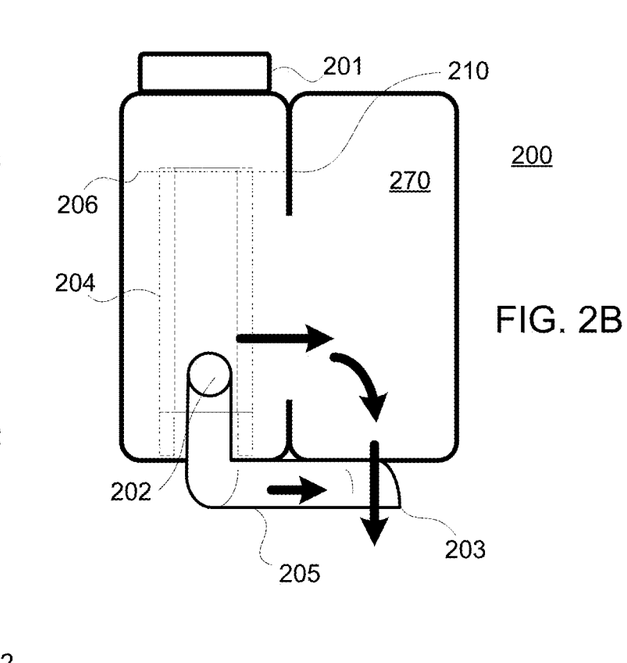
FIG. 2B shows an end view of the illustrative reservoir having an external by-pass of FIG. 2A, in accordance with some embodiments of the present disclosure.
Figure 2C:
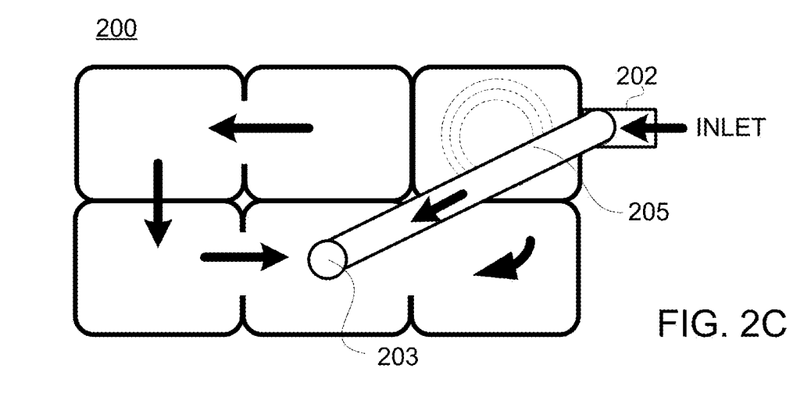
FIG. 2C shows a bottom view of the illustrative reservoir having an external by-pass of FIG. 2A, in accordance with some embodiments of the present disclosure.
Figure 2D:
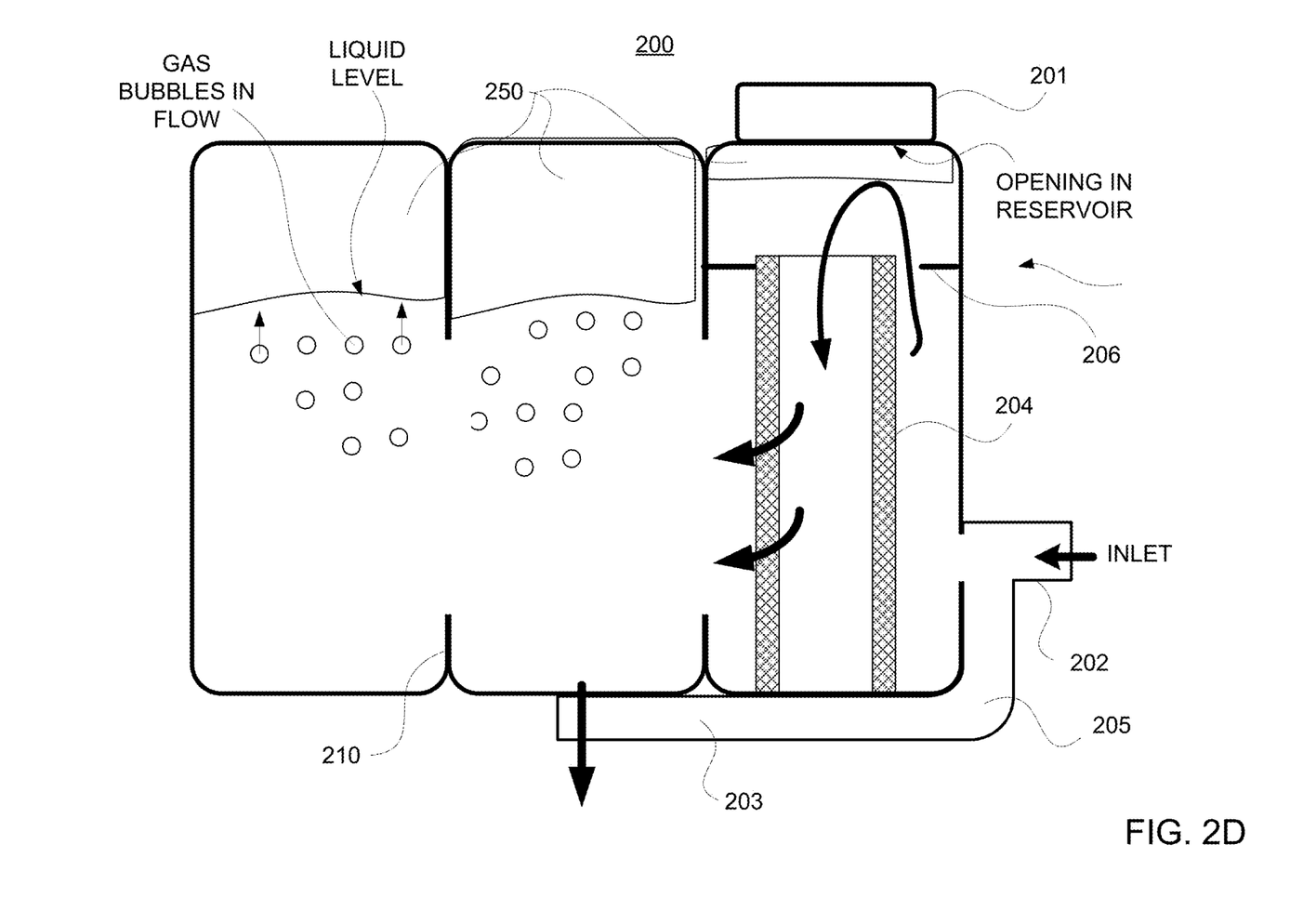
FIG. 2D shows a side cross-sectional view of the illustrative reservoir having an external by-pass of FIG. 2A, during operation, in accordance with some embodiments of the present disclosure.

FIGS. 2A-2D show four views of illustrative reservoir 200 having external by-pass 205, in accordance with some embodiments of the present disclosure. FIG. 2A shows a cross-sectional side view of reservoir 200, FIG. 2B shows an end view of reservoir 200, FIG. 2C shows a bottom view of reservoir 200, and FIG. 2D shows a cross-sectional side view of reservoir 200 during operation, in accordance with some embodiments of the present disclosure. The system of FIGS. 2A-2D is similar to the system of FIGS. 1A-1D, except that by-pass 205 is external to bulk volume 270. For example, by-pass 205 of FIGS. 2A-2D may be molded as part of reservoir 200 (e.g., a single piece) running along the outer surface of reservoir 200 (e.g., along the bottom, side, edge, or any other suitable outer surface). In a further example, by-pass 205 may include a separate conduit routed along the outer surface of reservoir 200 (e.g., along the bottom, side, edge, or any other suitable path along the outer surface).

Filter 204 shown in FIG. 2D may be arranged similarly to filter 104 of FIGS. 1A-1D. In some embodiments, filter 204 (e.g., as shown in FIGS. 2A-2D) may be configured to block particulate matter of a particular size range. For example, filter 204 may be configured to filter out particles larger than 100 microns, larger than 10 microns, larger than 1 micron, or any other suitable range. In some embodiments, filter 204 is removable. For example, cap 201 may be removed (e.g., unscrewed) and filter 204 can then be removed, replaced, and installed through the uncapped opening. In some embodiments, filter 204 includes a cylindrical filter element with one open end and one closed end. The closed end may be, but need not be, configured to seal against the bottom of reservoir 200 (e.g., in an annular recess) and the open end may seal along an edge to seal at the top against reservoir 200 (e.g., via a gasket integrated into filter 204 at surface 206) to create a flow path from the inner surface to outer surface of filter 204. The top seal may include flow paths that direct fluid from the inlet to the open end of filter 204 (e.g., without by-passing filter 204). In some embodiments, a reservoir may include a by-pass around the filter (e.g., separate from the by-pass and still directed to the de-aerating portion of the reservoir).

Figure 3A:
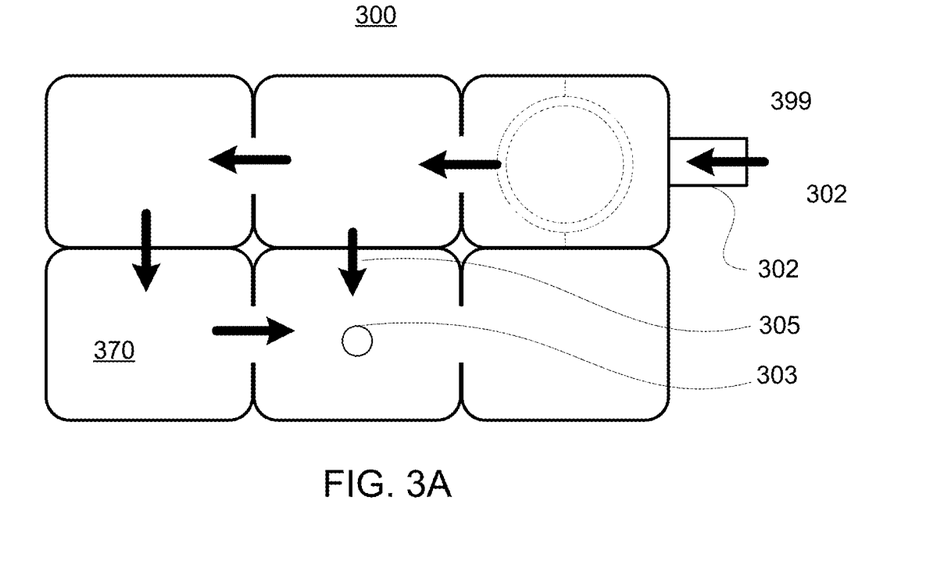
FIG. 3A shows a bottom view of an illustrative reservoir having an integrated post-filter by-pass, in accordance with some embodiments of the present disclosure.
Figure 3B:
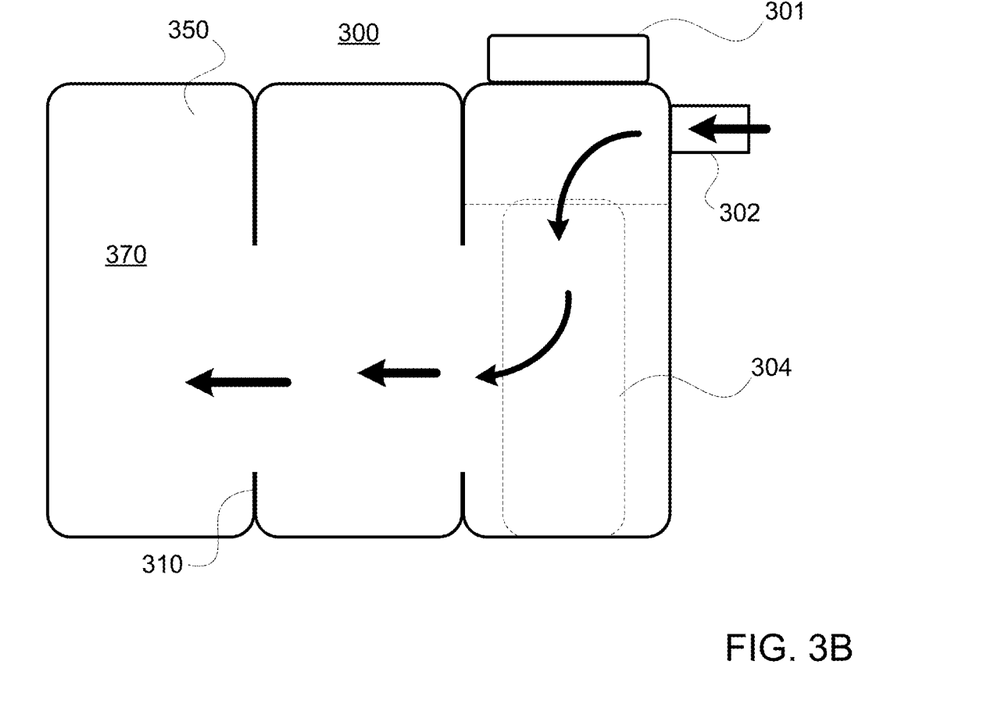
FIG. 3B shows a cross-sectional view of the illustrative reservoir having an integrated post-filter by-pass of FIG. 3A at Section 399, in accordance with some embodiments of the present disclosure.

FIGS. 3A-3B show two views of illustrative reservoir 300 having integrated, post-filter by-pass 305, in accordance with some embodiments of the present disclosure. FIG. 3A shows a bottom view of reservoir 300, and FIG. 3B shows a side view of reservoir 300, in accordance with some embodiments of the present disclosure. Reservoir 300 includes inlet 302, which directs flow to the inlet of filter 304. All of the fluid from inlet 302 flows through filter 304 and into bulk volume 370. The fluid in bulk volume 370 encounters baffles 310 that aid in separating gas bubbles (e.g., de-aerating by allowing bubbles to reach the freeboard region). The flow may be directed along any suitable path downstream of filter 304 to outlet 303. For example, in some embodiments, reservoir 300 may include integrated by-pass 305 that routes fluid from the downstream of filter 304 more directly to outlet 303 to prevent pressure drop associated with flow around baffles 310 and throughout bulk volume 370.

In some embodiments, filter 304 is removable. For example, cap 301 may be removed (e.g., unscrewed) and the filter element can then be removed, replaced, and installed through the uncapped opening. The filter of FIGS. 3A-B may be, but need not be, similar to filter 104 of FIGS. 1A-1D.

In some embodiments, a reservoir includes a molded by-pass passage configured to cause coolant flow from the inlet to be separated such that coolant with air flows through the expansion region of the reservoir while the rest of the coolant flows through the by-pass passage. In some embodiments, the reservoir is designed such that all of the coolant entering the reservoir is filtered before returning to the rest of the cooling system (not shown in FIGS. 1A-3B). In some embodiments, the coolant flows from the inlet port to the top of the filter chamber, through the filter, and then through the rest of the reservoir and integrated by-pass before exiting via the outlet port. In some embodiments, the filter chamber is designed such that the filter can be directly removed from the top of the reservoir (e.g., through an opening) by unscrewing the cap. This allows a quick replacement of the filter without the need to empty, flush, or prime the coolant system.

Figure 4A:
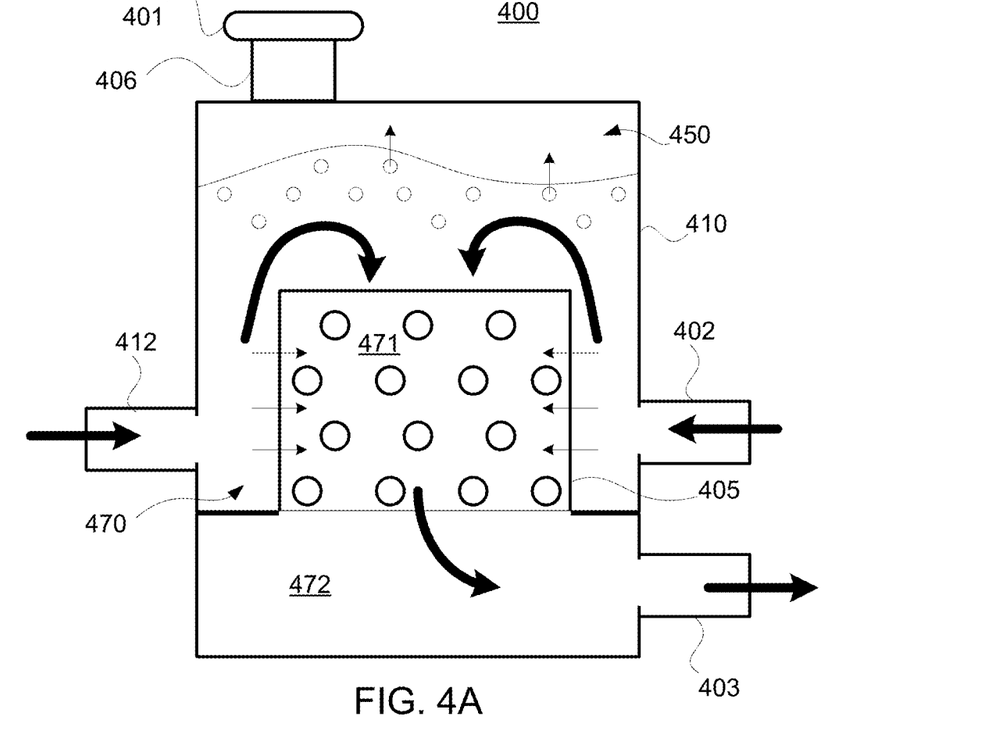
FIG. 4A shows a cross-sectional side view of an illustrative reservoir having more than one inlet, in accordance with some embodiments of the present disclosure.
Figure 4B:
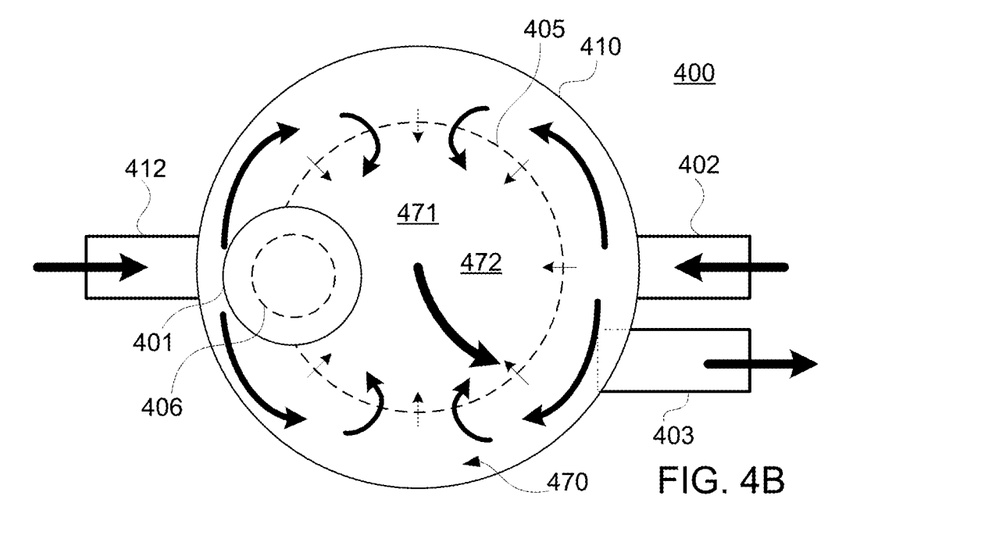
FIG. 4B shows a top view of the illustrative reservoir of FIG. 4A having more than one inlet, during operation, in accordance with some embodiments of the present disclosure.

FIG. 4A shows a cross-sectional side view of illustrative reservoir 400 having inlets 402 and 412, in accordance with some embodiments of the present disclosure. FIG. 4B shows a top view of illustrative reservoir 400 of FIG. 4A, in accordance with some embodiments of the present disclosure. Reservoir 400 includes inlets 402 and 412, which directs flow to outer volume 470 (e.g., radially outside of baffle 405, as illustrated). In the orientation illustrated in FIG. 4A, outer volume 470 azimuthally surrounds baffle 405, and extends above baffle 405, which acts as a by-pass. Fluid from outer volume 470 flows through and around baffle 405. For example, the portion that flows radially inward through baffle 405 (e.g., through holes or other fluid-permeable features of baffle 405, as illustrated) to inner volume 471 is the by-pass flow and the portion that flows over the top of baffle 405 (e.g., in the orientation illustrated in FIG. 4A) into inner volume 471 is the primary flow that is de-gassed to freeboard 450. The fluid in inner volume 471 then flows to region 472, which then directs flow to outlet 403. The relative larger volume of volume 472 allows lower fluid velocities, which are more conducive to de-gassing (e.g., entrainment of bubbles is reduced). As illustrated, reservoir 400 does not include a filter, although a suitable filter may be installed in either of both of inlets 402 and 412, outlet 403, or any other suitable location in a cooling system in which reservoir 400 is installed. In an illustrative example, a plurality of inlets (e.g., two or more inlets) may allow for better distribution (e.g., a more even distribution) of flow in reservoir 400.

In some embodiments, the reservoir of the present disclosure may be applied to coolant having high flow rates. For example, the reservoir of the present disclosure may operate without creating turbulent flow, maintaining laminar flow, or otherwise without causing increased turbulence. In a further example, the reservoir of the present disclosure may be configured to de-gas the system simultaneously with filtering. In an illustrative example, the reservoirs of the present disclosure may help maintain cleanliness of the coolant and ease of access for filter replacement without needing to flush the coolant system. In a further illustrative example, the reservoirs of the present disclosure may be used in cooling systems for battery systems, electric vehicles, or both, requiring relatively clean fluid (e.g., having flow passages that require particulate-free coolant).

In some embodiments, the reservoirs of the present disclosure may be configured to de-gas the cooling system without affecting thermal performance of an electric vehicle. In some embodiments, the reservoir design (e.g., having a capped opening and a filter configured to be removed and installed via the opening), helps ease the filter-replacement process.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A reservoir system for a liquid cooling system, the reservoir system comprising:
    an inner surface to contain liquid and define an inner volume, wherein the inner volume comprises a de-aeration volume separated into a plurality of adjacent regions by a plurality of baffles;
    an inlet port to receive a flow of a coolant;
    an outlet port to deliver the flow of the coolant, wherein the reservoir system is configured to cause the coolant to flow from the inlet port to the outlet port;
    an opening arranged at a top of the reservoir system;
    a cap to cover and uncover the opening;
    a filter element contacting and seated against an annular feature of the inner surface to seal a closed end of the filter element against the inner surface, wherein the coolant flows through the filter element, and wherein the filter element is removable through the opening; and
    a by-pass passage, arranged below a portion of the inner surface where the closed end of the filter element is sealed against the inner surface, to route a portion of the flow of the coolant to the outlet port without flowing through the filter element.

2. The reservoir system of claim 1, wherein the by-pass passage comprises a molded passage along the inner surface.

3. The reservoir system of claim 1, wherein the by-pass passage comprises a molded passage along an outer surface.

4. The reservoir system of claim 1, wherein one or more baffles of the plurality of baffles is configured to reduce a velocity of the flow of the coolant.

5. The reservoir system of claim 1, wherein an upper portion of the inner volume comprises a freeboard region comprising a gas phase.

6. The reservoir system of claim 1, wherein the filter element comprises a particulate filter.

7. The reservoir system of claim 1, wherein the filter element comprises a cylindrical element.

8. The reservoir system of claim 7, wherein the cylindrical element comprises:
    an open end to receive a first portion of the coolant;
    a radially inner surface, wherein the coolant flows from the open end to the radially inner surface; and
    a radially outer surface, wherein the coolant flows from the radially inner surface to the radially outer surface.

9. The reservoir system of claim 8, wherein the closed end of the filter element is impermeable to flow of the coolant.

10. The reservoir system of claim 8, wherein the closed end of the filter element is permeable to flow of the coolant.

11. The reservoir system of claim 8, wherein the annular feature comprises an annular recess that seats the closed end of the cylindrical element.

12. The reservoir system of claim 8, wherein:
    the reservoir system further comprises a circular opening; and
    the cylindrical element further comprises an annular gasket proximate to the open end to provide a seal between the filter element and the circular opening.

13. The reservoir system of claim 1, wherein the inlet port is positioned above a top of the filter element.

14. The reservoir system of claim 1, wherein:
    the inlet port is positioned below a top of the filter element; and
    the reservoir system further comprises a passageway between the inlet port and the top of the filter element.

15. A reservoir system for a liquid cooling system, the reservoir system comprising:
    an inner surface to contain liquid and define an inner volume;
    at least one inlet port to receive a flow of a coolant;
    an outlet port to deliver the flow of the coolant, wherein the reservoir system is configured to cause the coolant to flow from the at least one inlet port to the outlet port;
    a filter element contacting and seated against an annular feature of the inner surface to seal a closed end of the filter element against the inner surface, wherein:
        a first portion of flow of the coolant flows through the filter element, and
        the filter element is removable through an opening arranged at a top of the inner volume;
    a plurality of baffles that separates a de-aeration volume of the inner volume into a plurality of adjacent regions, wherein the plurality of baffles is arranged to:
        direct the first portion of the flow of the coolant to a first region of the inner volume, wherein the first portion of the flow of the coolant crosses the filter element contacting and sealed against the inner surface, and
        direct a second portion of the flow of the coolant to a second region of the inner volume, wherein the second region is configured to de-gas the second portion of the flow of the coolant, and wherein the second portion of the flow of the coolant does not cross the filter element; and
    a by-pass passage, arranged below a portion of the inner surface where the closed end of the filter element is sealed against the inner surface, to route a portion of the flow of the coolant to the outlet port without flowing through the filter element.

16. The reservoir system of claim 15, wherein at least one baffle of the plurality of baffles is further configured to house the filter element.

17. The reservoir system of claim 15, wherein at least one baffle of the plurality of baffles comprises:
    a solid wall that is impermeable to the coolant, and
    at least one opening that is permeable to the coolant, wherein the second portion of the flow of the coolant flows through the at least one opening.

18. The reservoir system of claim 15, further comprising a cap to cover and uncover the opening, wherein the filter element is removable through the opening when the cap is removed.

* * * * *